United States Patent
Pande et al.

(10) Patent No.: US 8,804,934 B2
(45) Date of Patent: Aug. 12, 2014

(54) SYSTEM AND METHOD TO ENABLE ACCESS OF MULTIPLE SERVICE PROVIDERS IN A SINGLE CALL

(75) Inventors: Arun Pande, Mumbai (IN); Sunil Kumar Kopparapu, Mumbai (IN); Imran Ahmed Sheikh, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 272 days.

(21) Appl. No.: 13/188,970

(22) Filed: Jul. 22, 2011

(65) Prior Publication Data
US 2012/0051532 A1    Mar. 1, 2012

(30) Foreign Application Priority Data

Aug. 31, 2010 (IN) .......................... 2422/MUM/2010

(51) Int. Cl.
| | |
|---|---|
| *H04M 3/42* | (2006.01) |
| *H04M 11/00* | (2006.01) |
| *H04M 3/46* | (2006.01) |
| *H04M 3/493* | (2006.01) |
| *H04M 3/428* | (2006.01) |

(52) U.S. Cl.
CPC ............ *H04M 3/465* (2013.01); *H04M 3/4285* (2013.01); *H04M 3/493* (2013.01)
USPC .............. 379/201.05; 379/211.04; 379/88.16

(58) Field of Classification Search
USPC ................ 379/201.02, 201.05, 211.04, 88.16
See application file for complete search history.

(56) References Cited

U.S. PATENT DOCUMENTS

| | | | |
|---|---|---|---|
| 5,155,761 A | 10/1992 | Hammond | |
| 5,185,782 A | 2/1993 | Srinivasan | |
| 5,436,967 A | 7/1995 | Hanson | |
| 5,627,884 A | 5/1997 | Williams et al. | |
| 6,400,804 B1 * | 6/2002 | Bilder | 379/76 |
| 6,563,921 B1 | 5/2003 | Williams et al. | |
| 6,754,334 B2 | 6/2004 | Williams et al. | |
| 6,993,122 B2 * | 1/2006 | Malik et al. | 379/211.02 |
| 8,184,797 B1 * | 5/2012 | Rosen | 379/218.01 |
| 8,229,081 B2 * | 7/2012 | Agapi et al. | 379/88.04 |
| 2006/0104430 A1 * | 5/2006 | Kirkland et al. | 379/211.04 |
| 2006/0106711 A1 * | 5/2006 | Melideo | 705/37 |
| 2007/0071223 A1 * | 3/2007 | Lee et al. | 379/265.02 |
| 2007/0269038 A1 * | 11/2007 | Gonen et al. | 379/265.02 |
| 2008/0310606 A1 * | 12/2008 | Pines et al. | 379/93.01 |
| 2009/0207996 A1 | 8/2009 | Berger et al. | |
| 2010/0104075 A1 | 4/2010 | Wang | |
| 2010/0158218 A1 | 6/2010 | Dhawan et al. | |

* cited by examiner

*Primary Examiner* — Sonia Gay
(74) *Attorney, Agent, or Firm* — Oliff PLC

(57) ABSTRACT

The present invention proposes a system and a method to enable an IVR mashup interface to ease the selection of services over a communication device and enhances the caller experience by ways of personalizing the call and making effective use of the call hold time. The said system and method as implemented by the mashup server automatically connects the caller to the most immediate service offering service provider after simultaneously placing of the call to various service providers. In the mean time, the mashup server simultaneously calculates the wait time to get connected to service provider after a call is made to mashup service and relays appropriate promotional content to the caller based on such wait time and the profile of the user. Further the system and method as proposed is capable of representing a user and transact on behalf of the user by talking to the live agents or interacting with the automated IVR systems representing the service providers.

9 Claims, 7 Drawing Sheets

SYSTEM AND METHOD TO ENABLE ACCESS OF MULTIPLE SERVICE PROVIDERS IN A SINGLE CALL

FIELD OF THE INVENTION

The present invention generally relates to the field of Interactive Voice Response (IVR) systems and voice-portals. More particularly the invention relates to a system and method for enhancing user interface and experience while accessing multiple service providers providing a similar service by forming an IVR mashup.

BACKGROUND OF THE INVENTION

Today, telephone voice channel has become an easy channel to book certain services and also to do an inquiry and get information on various services. Services like Radio-Cabs, Travel Portals, Movie-show bookings, Local Search Engine etc are becoming popular and users prefer to be serviced through a telephone call. Any popular service (say Taxi/Cab) usually has multiple service providers. Though these multiple service providers provide the same type of service to the end user, the end user has to call a different service number to make use of the service of that particular service provider. This essentially means even if the end user does not have a preferred service provider, they have to choose a particular service provider to gain service. In essence the user experience can not be guaranteed. For example if there are two service providers say SP A and SP B; at a given time say SP A is able to provide the required service while SP B is not; say user has no preference to SP A or SP B; user calls up SP B and wants to avail of a service which SP B can not provide; so the user calls SP A and tries to avail of the service. The user experience is bad because of wasted telephone calls (calls SP B and then SP A) and time (time taken to find SP B is not available and then time taken to actually ask for services of SPA). The present invention enables the richer user experience in terms of both time and naturalness.

Typically, when a user calls these services over the telephone, the call is answered by a live agent or by an automated IVR (Interactive Voice Response) system. Invariably, in either situation, the caller is put on hold; especially if the ratio of the agents to the simultaneous calls is high; and in many cases suggesting the approximate time the user has to wait for the users call to be serviced in between hold music. After a certain hold time, the caller is able to interact with the service provider (can talk to the agent/IVR) and is able to make the service request. In many cases the caller (user) request may not be served in a single call to a service operator; for reasons like operator could not provide with the requested service or the caller wants to get information from another similar but different service operators and then make a decision. The caller has to the dial the next service operator where he may be put to hold again and the cycle repeats. For example; Radio-Cabs have become popular in many countries and usually have multiple operators in a particular region. Though there are other modes, the most popular mode to book a cab still remains the voice mode where the user dial's a predefined service provider number and talk's to a human agent to make the transaction (booking). When the user dials the cab service, he is put to hold by the IVR system and has to wait till an agent is available to service the call. The soft music and advertisements played to the caller during the wait are in most cases irrelevant to the user and in most cases frustrating to the caller. When the caller's turn comes, he can talk to the agent and make a cab reservation subject to of course the actual availability of the cab. In an optimistic scenario the user gets to reserve the taxi, but in a pessimistic scenario (the service provider can not provide the service) the user has to dial another cab operator and go through the same sequence, wait until the user can connect to an agent before the user requirement can be fulfilled. In such a scenario, using the telephone channel there is no way the user can connect to the taxi operator which can answer him fastest or first. Unlike a web portal or a web mashup, there is no way for the user to check the offerings from different service operators and choose the best among them using the telephone channel.

As seen in the example scenario the user experience is poor and the user in a worst case scenario may be left with no information even though there are several operators for the service. Thus, the telephone service channel faces following shortcomings:

Long hold times and no effective use of the hold time. Usually some music or repetitive advertisements are played which are extraneous to the caller.

Inability to connect to the least wait time service operator. Sequential connection, one after the other, to service operators or the sources of information. There is no way to get information from various service operators in the same call.

The user has to speak the same information every time he talks to the new service operators; the user speaking the same information several times is redundant.

Several inventions have been made in this domain some of them known to us are described below:

US Patent application 20100104075 describes a method, apparatus and system for enhancing a processing priority, Implementing Interactive Service and for Generating Customized IVR Flow. US'075 application claims to change processing priority and customize IVR call flow based on the subscriber information. However, the proposed system doesn't disclose about changing of the service IVR call flow.

US Patent application 20100158218 describes a method for interactive service through a system of Voice Applications setup over a new Distributed architecture consisting of Internet, VOIP, Telephones, Cellular Phones and dedicated local devices. US'218 patent application also teaches on utilization of voice applications that are performed by voice applications agent's resident on user local devices to deliver messages to the users. However, the proposed system is hosted intermediate IVR service which eases and enhances caller experience through an IVR Mashup service over the existing telephone architecture, in the common Single Service Multiple Service-Operator scenario. Although US'218 discloses a service to connect user to purchase goods and services, it does not address the solution for an IVR Mashup service. The proposed invention provides an IVR Mashup service over the existing architecture of tele-communication system.

US Patent Application 20090207996 and the prior art approaches in U.S. Pat. Nos. 5,627,884, 6,563,921, 6,754,334, 5,436,967, 5,185,782 and 5,155,761 present system and methods to eliminate hold time. However, in these systems the user has to make a request to the called party system or a third party system through a phone call or a data device and then in return to the request the called party or the third party system calls back the user when the called party live agent is available. These systems rely on the callbacks for access to the required information. Also they do not provide method to enable service provider selection nor do they provide an IVR mashup over the telephone system as proposed by the invention.

Though speaking over a telephone is a preferable mode to order services over other modes like website and messaging, it is comparatively less efficient in the current form and fails to address the poor user experience.

Therefore, there is a long-felt need for a system that addresses the shortcomings mentioned above that enables a mashup like interface over the communication device thus providing both ease to the access of services and information and enhancing caller experience. The present invention primarily proposes a system and method for enabling a mashup of IVRs of different service providers providing the same service using existing service flow without implementing a new distributed architecture.

Other features and advantages of the present invention will be explained in the following description of the invention having reference to the appended drawings.

OBJECTS OF THE INVENTION

The primary object of the present invention is to provide a system for enabling a mashup of IVRs of different service providers providing the same service in a single call.

It is another object of the present invention to provide an IVR interface to ease the selection of services over a communication device and enhance the caller experience by ways of personalizing the call and making effective use of the call hold time.

It is yet another object of the present invention to provide a system which automatically connects the user to the most immediate service offering service provider.

It is yet another object of the present invention to simultaneously calculate the wait time to get connected to service provider after a call is made to mashup service and relays appropriate promotional content to the caller based on such wait time and the profile of the user.

It is yet another object of the present invention to provide an automated IVR system, which is capable of representing a user and transact on behalf of the user by talking to the live agents or interacting with the automated IVR systems representing the service providers.

It is yet another object of the present invention to provide the IVR mashup service that can serve like a web mashup and provide service from various service providers in the same call.

It is yet another object of the present invention to provide a system that processes the voice request signal made by the registered user and optionally determines the query from the registered user's request and simultaneously places call to one or more service provider.

It is yet another object of the present invention to provide a system that determines the wait time for the user to get re-connected to the service provider and accordingly relays the infotainment messages to the user, based on the information entered in the user profile at the time of registering the profile by the user.

It is yet another object of the present invention to provide mashup service that calls a preferred service provider of the user and completes the transaction on behalf of the user automatically.

It is yet another object of the present invention to provide mashup server which is competent to complete the transaction on behalf of the user and calls back the user to furnish the service details upon receiving an initial request from the user.

SUMMARY OF THE INVENTION

The present invention proposes a system and a method to enable an IVR mashup interface to ease the selection of services over a communication device and enhances the caller experience by ways of personalizing the call and making effective use of the call hold time. The said system and method as implemented by the mashup server automatically connects the caller to the most immediate service offering service provider after simultaneously placing of the call to various service providers. In one embodiment of the present invention the mashup server simultaneously calculates the wait time to get connected to service provider after a call is made to mashup service and relays appropriate promotional content to the caller based on such wait time and the profile of the user.

Further the system and method as proposed is capable of representing a user and transact on behalf of the user by talking to the live agents or interacting with the automated IVR systems representing the service providers.

In another aspect of the present invention the mashup service that can serve like a web mashup and provide service from various service providers in the same call.

In another aspect of the invention the proposed system has a speech recognition engine that processes the voice request signal made by the registered user and further determines the query from the registered user's request followed by simultaneous placement of call to one or more service provider. The speech recognition engine in another aspect also determines the wait time (from the service provider message) for the user to get re-connected to the service provider and accordingly relays the infotainment messages to the user, based on the information entered in the user profile at the time of registering the profile by the user.

In another aspect of the present invention mashup server calls a preferred service provider of the user and completes the transaction on behalf of the user automatically and calls back the user to furnish the service details upon receiving an initial request from the user.

BRIEF DESCRIPTION OF THE ACCOMPANYING DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific system and method disclosed in the drawings.

DETAIL DESCRIPTION OF THE INVENTION

Figure 1:
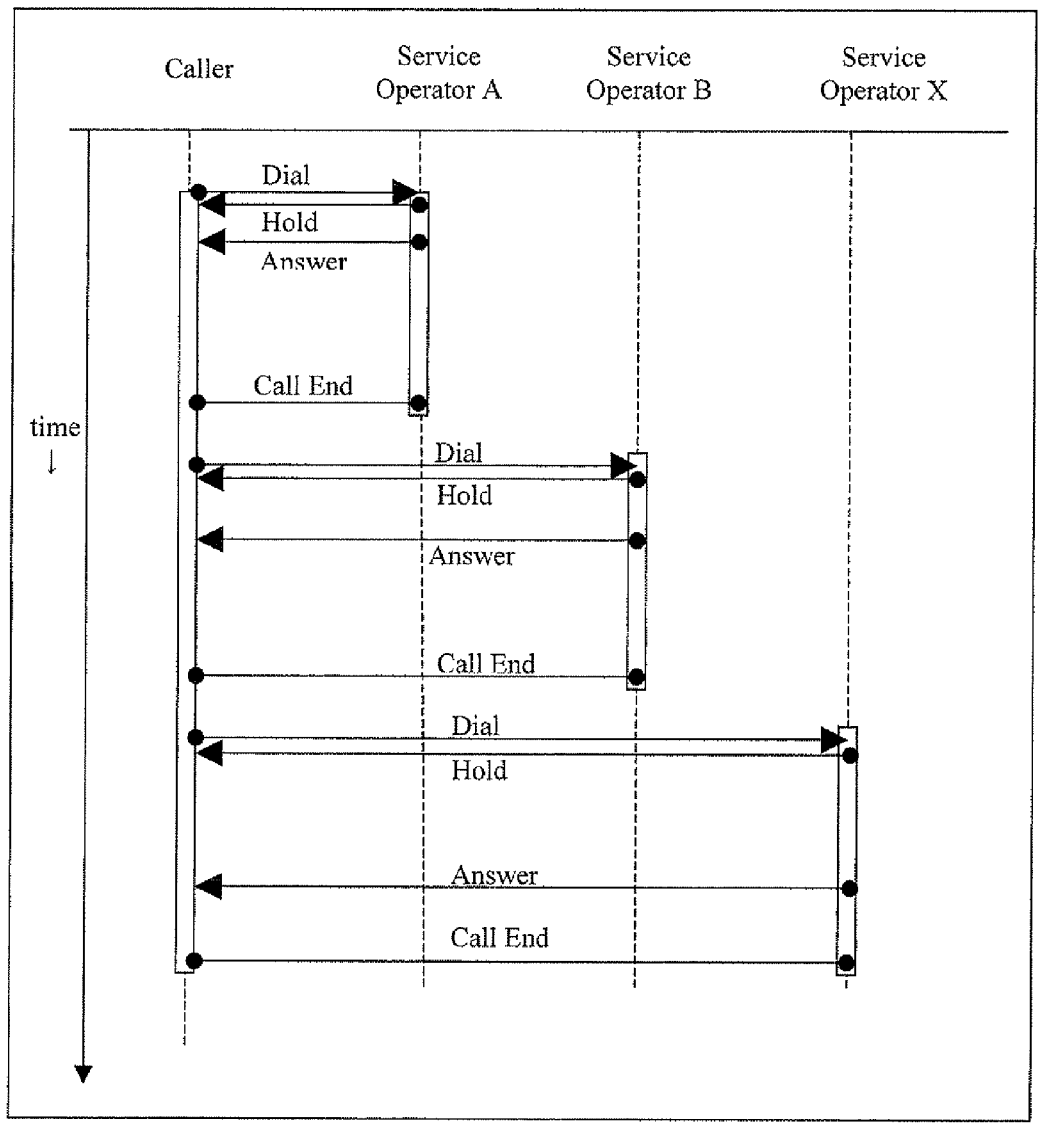
FIG. 1 illustrates a timeline describing a typical scenario where a user has to call several different, same service providing, service providers to book a service.

Some embodiments of this invention, illustrating its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any methods, and systems similar or equivalent to those described herein can be used in the practice or testing of embodiments of the present invention, the preferred methods, and systems are now described.

The disclosed embodiments are merely exemplary of the invention, which may be embodied in various forms.

According to one embodiment of the invention, the mashup can be a server or service or utility or application that uses and combines data, presentation or functionality from two or more sources to create new services.

According to one embodiment of the invention, a method of obtaining information from various service providers in the same call wherein IVRs of the two or more service providers providing a similar service are provided in a mashup form, using the machine implemented steps of:
- creating a user profile of the caller by seeking and storing on a web-platform the data in one or more fields in the user profile;
- automatically answering the user's call by the mashup server followed by simultaneous placement of call to one or more service provider;
- simultaneously calculating the wait time and relaying appropriate promotional content to the caller based on such wait time and the profile of the user;
- connecting the user in sequence of immediate availability to one or more service provider agent or IVR;

According to another embodiment of the invention, a user who wishes to use the IVR mashup service registers with the mashup service provider website with data like age, sex, location, interests, date of birth, occupation, income range, address, contact no. etc. This information is stored with a web-platform. It is further used to play targeted, personalized infotainment messages and advertisements during the wait time or in a situation wherein the mashup service calls back to the user.

According to another embodiment of the invention, the user communicates with IVR mashup through communication device, the communication device can be selected from the set comprising Landline phone, cellular telephone, VOIP phone, paging device, a personal computer, a PDA, a pocket computer, and a hybrid device.

The present invention envisages an IVR mashup service. Particularly, the system envisaged by the present invention provides an ease of use and automated IVR interface between the caller and the service providers, which enhances the caller experience on one side and on the other side connects to the service provider and optionally talks to multiple service providers simultaneously, thus making services over communication device easy to use, convenient and efficient.

Referring to the drawings, there is disclosed a system for enabling an IVR mashup system over telephone, the accompanying drawings do not limit the scope and ambit of the invention and are provided purely by way of example and illustration.

FIG. 1 illustrates a timeline describing a typical existing scenario where a user needs a service and has the option of obtaining this service from multiple providers of the same service.

The process as shown in FIG. 1 provides an existing scenario, in this scenario when the user calls a service provider; he is put on hold, until the service provider is able to service the user request (until a human operator is available to answer). The user then dials the next service provider only after the previous call is complete; and the wait cycle repeats. Thus the user gains access to the service only after being put on wait by each of the providers and additionally there is an interaction time (speaking to the human agent of the service operators) until finally served by a particular Service provider. During the wait times usually some music or advertisement promotions are played, which are as it is today irrelevant and most of the times frustrating to the caller; even in the most optimistic scenario when the user was to call only a single service provider. This wait time and the soft music or irrelevant advertisement degrades the overall user experience and hampers the simplicity and easiness of using the telephone services.

Figure 2:
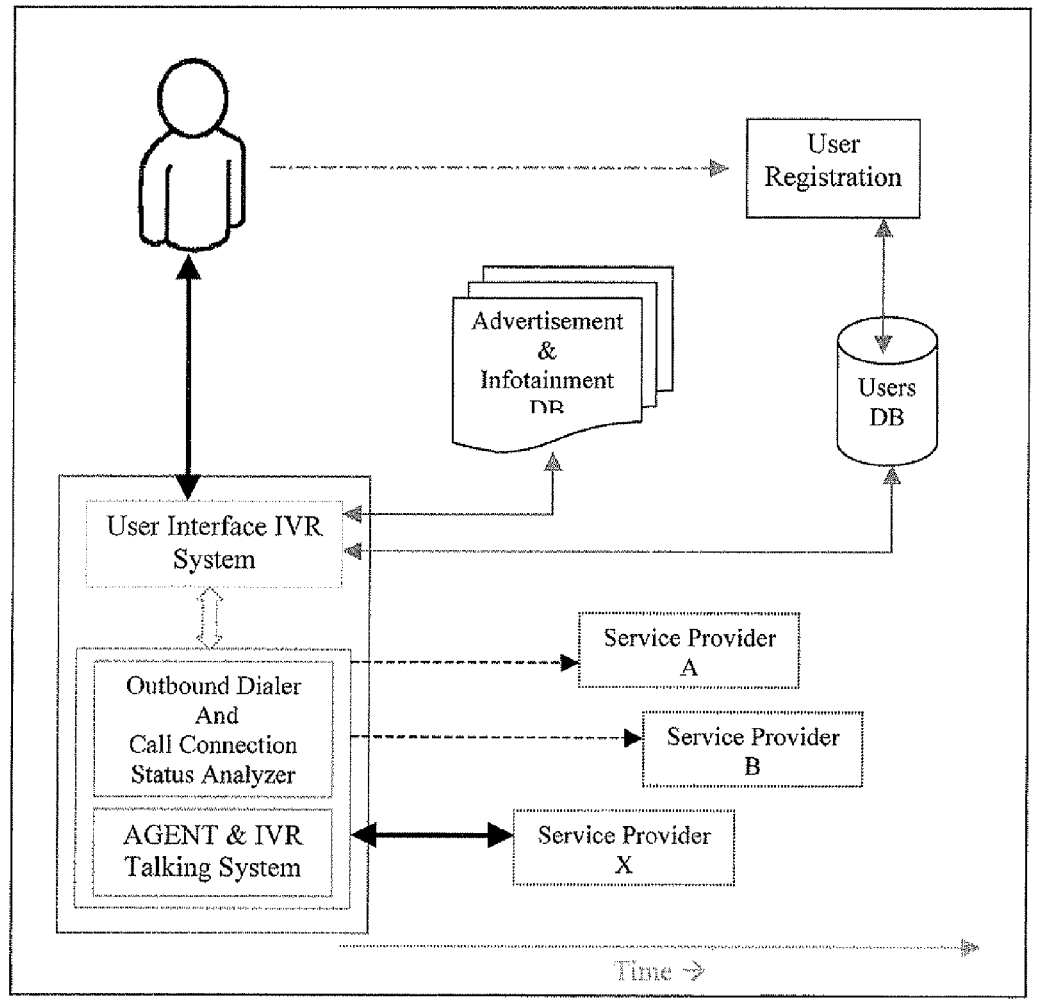
FIG. 2 illustrates overview architecture of the proposed IVR Mashup platform.

According to an exemplary embodiment of the invention, the system achieves the objective of enhancing the caller experience and easing the use of on-call services by creating an IVR mashup system. FIG. 2 illustrates the architectural overview of the IVR mashup system. As depicted in FIG. 2, the system is an IVR interface which interacts with the caller on one end and interacts with multiple service providers on the other end. In a typical scenario a user who wishes to use the IVR mashup service registers on the web with data (disclosed above). When the user wants to make use of the on-call services the user calls the mashup service. The mashup service answers the user's call and then automatically and simultaneously places calls to multiple service providers. In the meantime, the mashup system determines for how long and what advertisement (for a set of advertisements) must be played to the user. In one embodiment the advertisements are targeted to the caller using the basic details available in the online user profile. Personalized infotainment messages and advertisements are then relayed to the user. When connected to any one of the service providers (provider with minimum wait time to connect), the mashup connects the user to the service provider so that he can speak to the agent or the IVR representing the service provider to complete the transaction.

In another exemplary embodiment the mashup service is implemented using a server or a computer.

Figure 3:
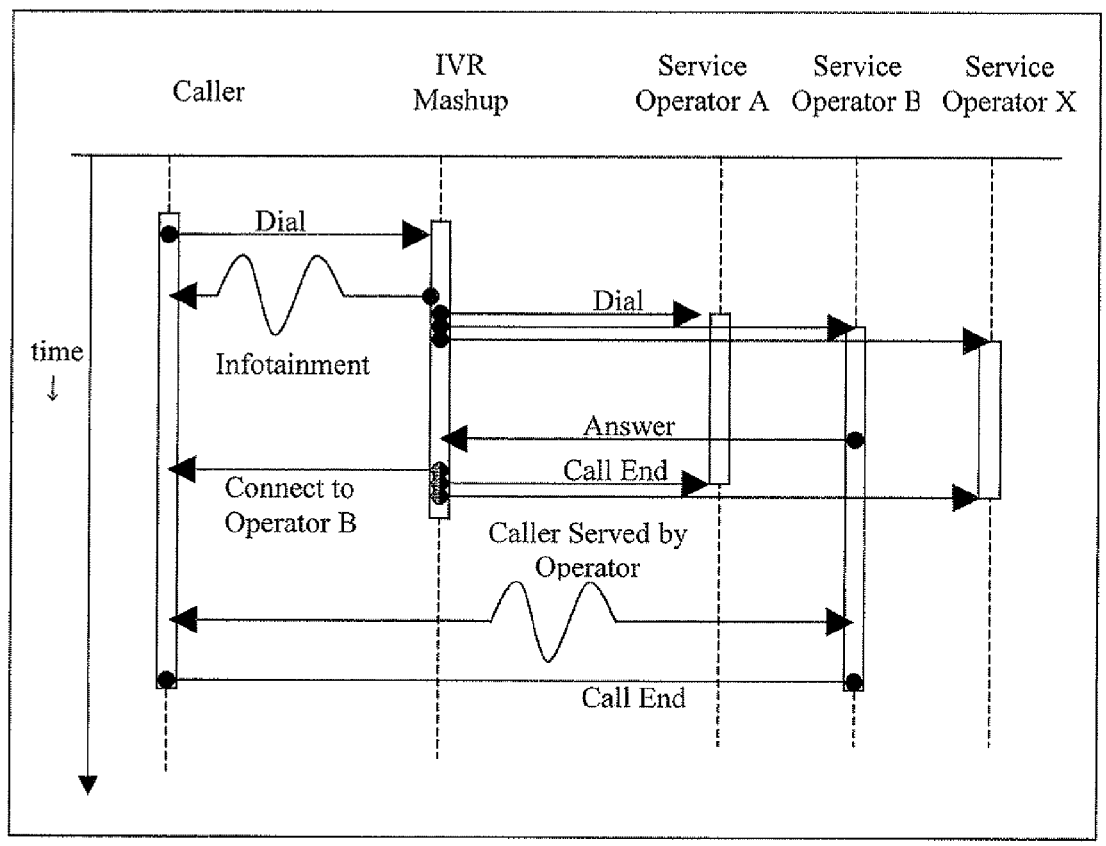
FIG. 3 illustrates a timeline describing a typical transaction completed by the mashup service built according to an exemplary embodiment.

FIG. 3 illustrates a timeline describing a typical transaction using the IVR mashup service built according to an exemplary embodiment. The steps involved in this transaction can be elaborated as follows:
- The transaction begins when a registered user dials the IVR Mashup service.
- The IVR Mashup service then simultaneously calls different service providers, and waits for them to answer. On the other end it refers to the user's profile and plays relevant infotainment messages and advertisements.
- When a service provider (the provider with minimum wait time) answer's the call from the Mashup service, the Mashup system connects the caller to this service provider and disconnects to the other service provider. The caller can now directly speak to the service provider's agent or IVR for further communication.

Figure 4:
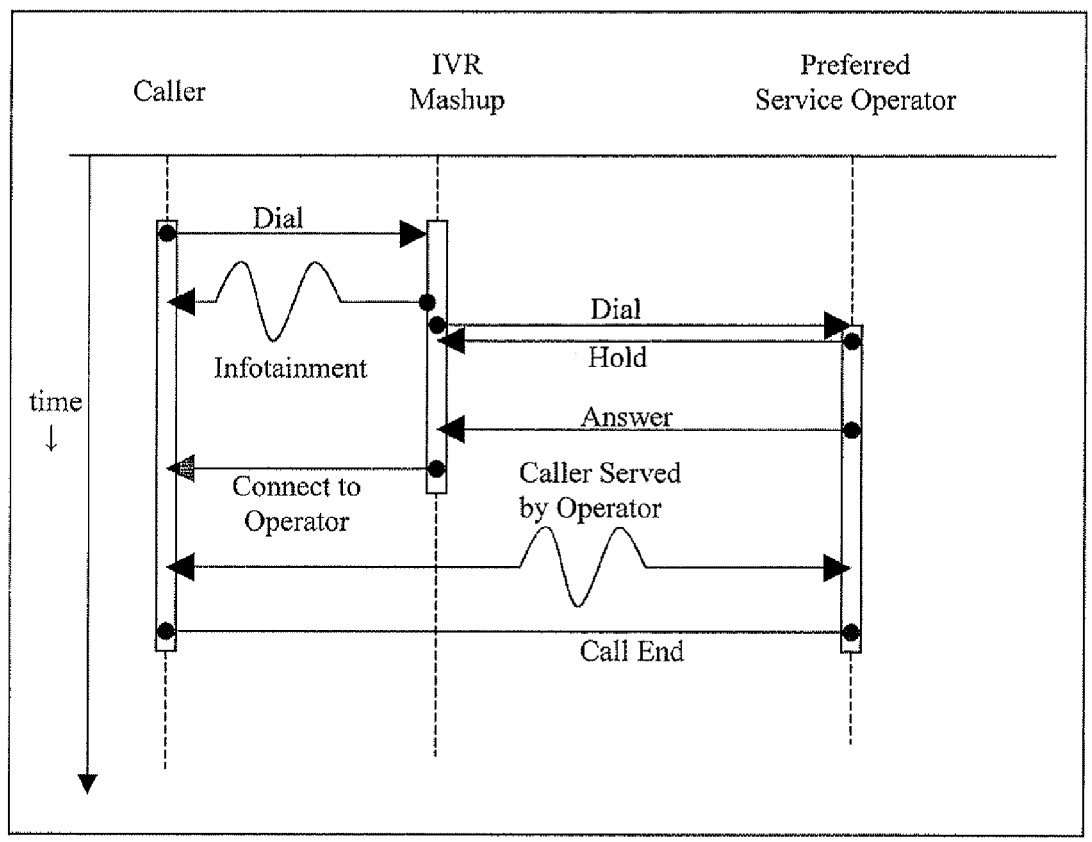
FIG. 4 illustrates a timeline describing a transaction completed by the mashup service by connecting the caller to the preferred service provider.

In yet another embodiment, the mashup service calls and connects only to that service provider which is preferred by the user, as illustrated in FIG. 4. The preferred service provider is known from the user's profile. In both these illustrations of FIG. 3 and FIG. 4 the mashup service completes the transaction by connecting the caller to the service provider.

Figure 5:
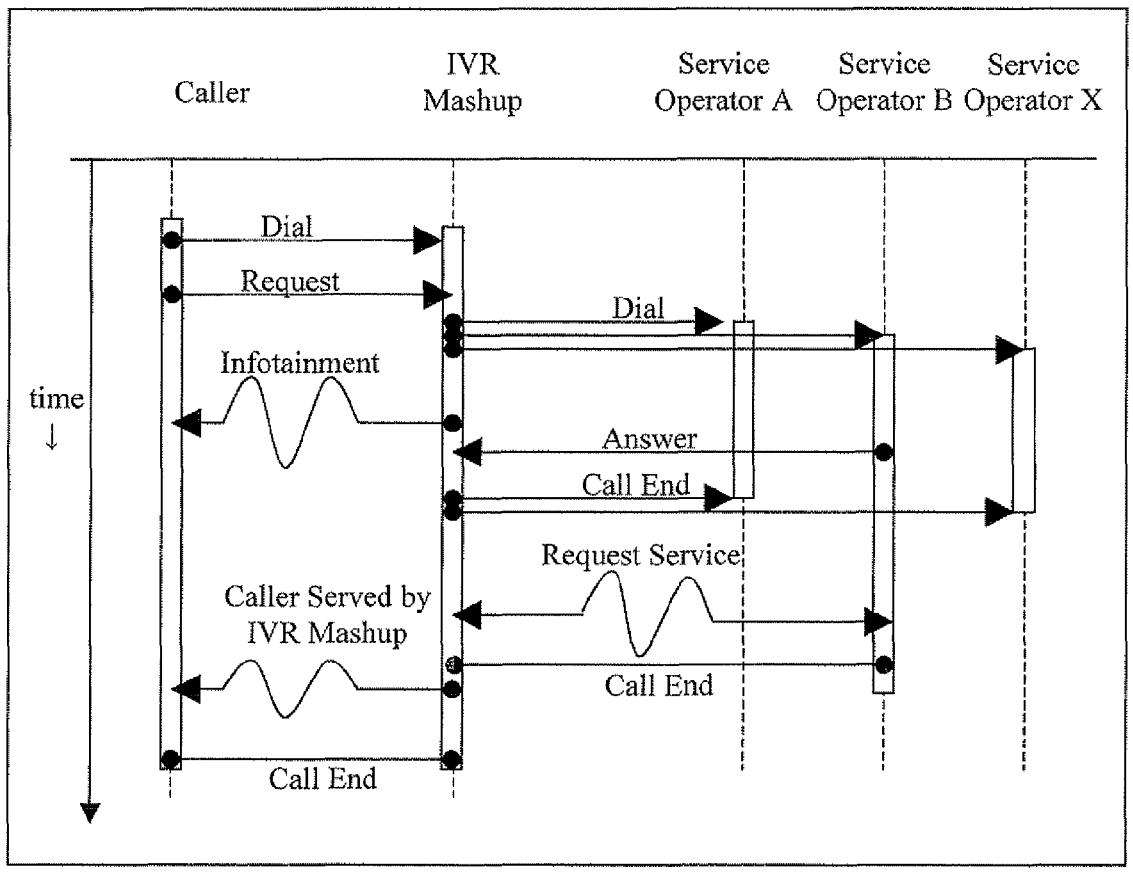
FIG. 5 illustrates a timeline describing a transaction completed by the mashup service by connecting and talking to the immediate available service provider, on behalf of the user.

FIG. 5 illustrates another transaction using the mashup service in which the Mashup service, talks to the user on one end and the agent/IVR representing the service provider on other end. The steps involved in this transaction can be elaborated as follows:

The transaction begins when a registered caller dials the Mashup service and speaks a request; for instance, "Want to book a taxi from home to work tomorrow at 10 am". The Mashup service understands the request (using speech recognition engine by converting speech into text) and determines other details; like the source and destination or query for the request, from the caller's registered profile.

The Mashup service then simultaneously calls different service provider s, and waits for them to answer. On the other end it refers to the caller's profile and plays relevant infotainment messages and advertisements to the caller.

When a service provider (the provider with minimum wait time) answer's the call from the Mashup service, the Mashup system connects the caller to this service provider. It additionally speaks (using text to speech engine) to the service provider answering agent and/or IVR. Meanwhile, the mashup service continues to play relevant infotainment and advertisement messages to the caller.

On completion of the transaction, the mashup service answer's the caller and updates him of this service request.

Figure 6:
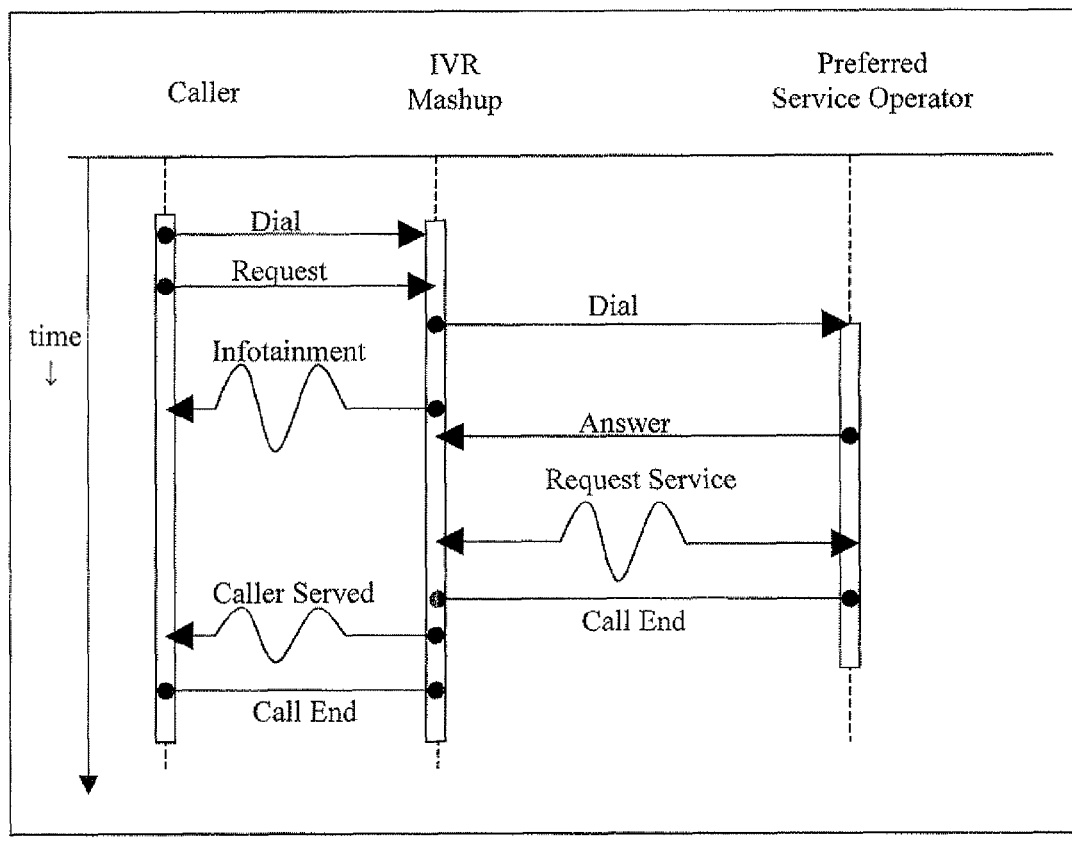
FIG. 6 illustrates a timeline describing a transaction completed by the mashup service by connecting and talking to the user preferred service provider, on behalf of the user.

As seen in this illustration (FIG. 5) the mashup service connects to the service provider which answers first. It is further possible to combine the embodiments illustrated through FIG. 5 and FIG. 4 so that the mashup service calls only one service provider which is preferred by the user and completes the transaction on its own. The preferred service provider is known either from the users profile or recognized from the request made by the user. This is illustrated by the sequence diagram in FIG. 6. After getting connected to the service provider, the mashup service talks on behalf of the user and gets the user request answered from the service provider agent and/or IVR. The mashup service then answer's to the caller's request.

According to another embodiment of the invention, it is further possible that the user calls the mashup service, makes a request and disconnects the call. The mashup service completes the transaction on behalf of the user by talking to the live agents or interacting with the automated IVR systems representing the service providers and calls back the user to furnish the service details based on an initial request placed by the user.

Figure 7:
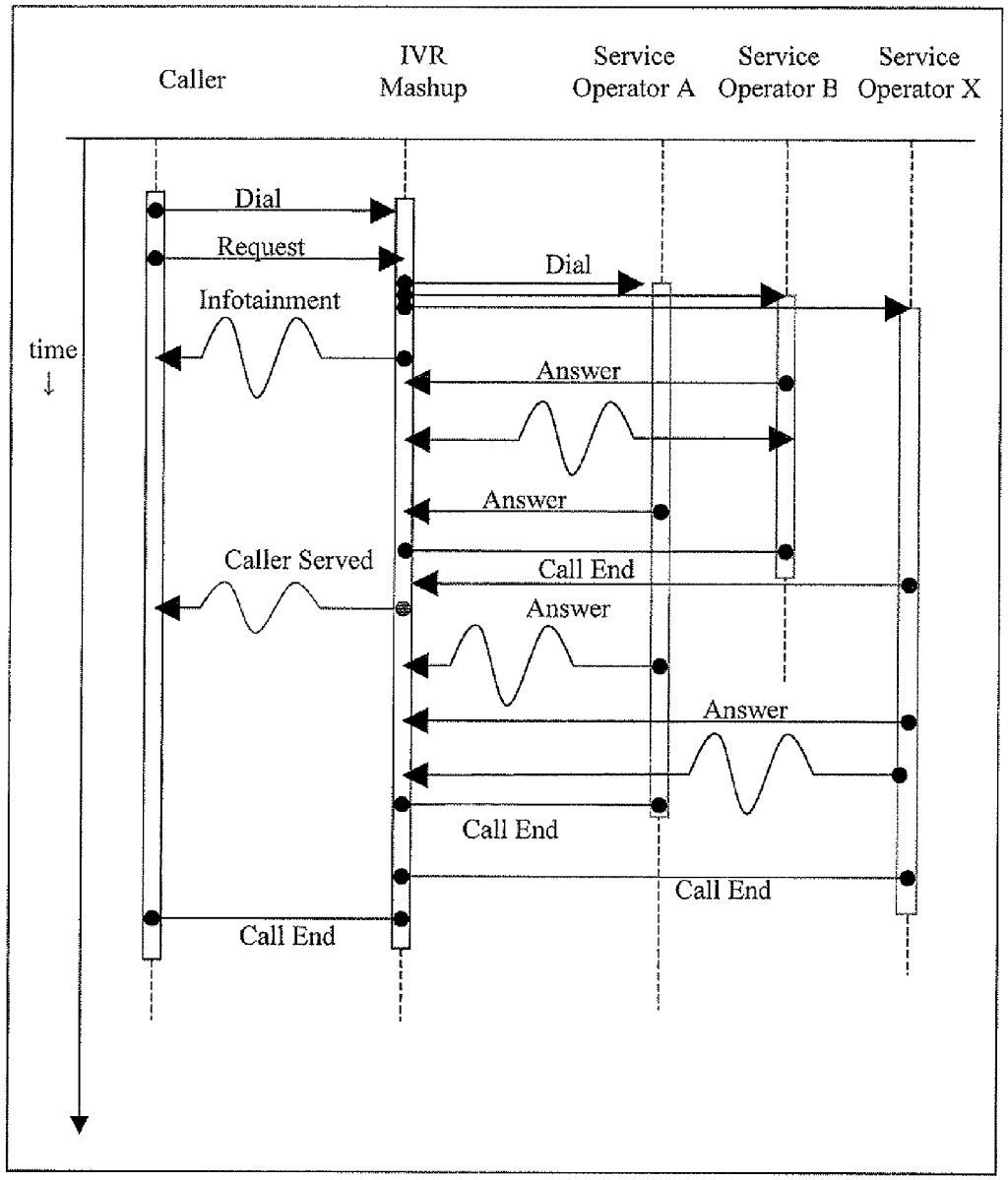
FIG. 7 illustrates a timeline describing a transaction completed by the mashup service by connecting and talking to all the service providers to mash up the information requested by user.

In some embodiments, the IVR mashup service can serve like a web mashup and provide service from all the service providers in the same call. This is illustrated by the sequence diagram in FIG. 7. As shown, the user calls the mashup service IVR and makes the request. The mashup service calls all the service providers simultaneously and on other end starts playing infotainment and advertisement message to the user. The mashup service talks to the service providers after the wait period. The mashup service is capable of talking simultaneously to more than one service provider. The mashup service then provides the answers to the user's request as and when it completes a transaction with a service provider or provides an update of information together at the end. It is also possible for the mashup service to complete the call with the service providers and calls back the user to furnish the service details as requested by the user.

Additional functions in the embodiments could use speech recognition engine to determine the wait time to get re-connected to the service provider from the wait message played by the provider before putting the call on hold. And since the wait time of the provider is known, it determines the duration of the advertisement to be played and then accordingly relays the infotainment messages to the user, based on the information entered in the user profile at the time of registering the profile by the user.

While considerable emphasis has been placed herein on the particular features of this invention, it will be appreciated that various modifications can be made, and that many changes can be made in the preferred embodiments without departing from the principles of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

Advantages of the Invention:
1. Provides an enhanced voice user interface to the caller to reach the fastest service provider among various service providers in a same call.
2. Enhancement in caller experience and make easy to use mashup services over the existing telephone architecture.
3. Provides a system that can understand the user's voice request and is competent to complete the transaction on behalf of the user by automatically taking to the service provider and further calls back the user to furnish the service details as requested by the user.
4. Provides a system for personalizing a call for a caller, by accepting personalized requests and presenting personalized advertisements and infotainment messages in call hold times;
5. Provides an automated IVR mashup system which represents a customer and talk to the live agents as well as represents the service provider at the other end.

The invention claimed is:
1. A method for connecting a user with a vendor of a plurality of vendors providing a similar service, the method comprising:
creating a user profile associated with the user, wherein the user profile comprises user's personal data and one or more preferred vendors selected by the user;
automatically answering, by a mashup server, a user's phone call;
initiating a call, based upon the user's phone call, to simultaneously tie-in Interactive Voice Response (IVR) system of each vendor in the call;
determining a wait time associated with each vendor in the call, wherein the wait time is an amount of time required by each vendor before the mashup server actually interacts with each vendor, wherein the wait time is determined based upon a voice response message received from the IVR system of each vendor after the initiation of the call;
determining the vendor from the plurality of vendors based upon the wait time associated with each vendor and the one or more preferred vendors present in the user profile;
disconnecting the call with all of the plurality of vendors except with the vendor; and connecting the user with the vendor.

2. The method of claim 1, further comprising playing infotainment messages and advertisements relevant to the user's personal data until the wait time associated with the vendor is expired.

3. The method as claimed in claim 2, wherein the user's personal data comprises an age of the user, a sex of the user, a location of the user, interests of the user, a date of birth of the user, an occupation of the user, an income range of the user, and a contact number of the user.

4. A system for connecting a user with a vendor of a plurality of vendors providing a similar service, the system comprising:
   a processor; and
   a memory coupled to the processor, wherein the processor is configured to execute programmed instructions stored in the memory in order to:
      create a user profile associated with the user, wherein the user profile comprises user's personal data and one or more preferred vendors selected by the user;
      automatically answer a user's phone call;
      initiate a call, based upon the user's phone call, to simultaneously tie-in Interactive Voice Response (IVR) system of each vendor in the call;
      determine a wait time associated with each vendor in the call, wherein the wait time is an amount of time required by each vendor before the system actually interacts with each vendor, wherein the wait time is determined based upon a voice response message received from the IVR system of each vendor after the initiation of the call;
      determine the vendor from the plurality of vendors based upon the wait time associated with each vendor and the one or more preferred vendors present in the user profile; and
      connect the user with the vendor.

5. A system for obtaining information from a plurality of vendors providing similar services and/or products, the system comprising:
   a processor; and
   a memory coupled to the processor, wherein the processor is configured to execute programmed instructions stored in the memory in order to:
      automatically answer a user's phone call;
      capture a voice request message provided by a user in the user's phone call, wherein the message includes information about a service or product desired by the user;
      convert the voice request message into a text request message using a speech recognition engine;
      identify a query, a source and a destination from the text request message associated with the voice request message;
      initiate a call, based upon the destination present in the text request message, to simultaneously tie-in the plurality of vendors capable of providing the service or product to the user;
      convert the query from the text request message into a speech message using text to speech engine;
      transmitting the speech message to the plurality of vendors present in the call after disconnecting the user's phone call;
      receiving a response from each vendor of the plurality vendors based upon the message transmitted;
      re-establishing a call with the user after the receipt of the response of each vendor;
      communicating the response of the each vendor to the user over the re-established call.

6. The method of claim 1, wherein the service comprises a radio-cab service, a travel portal, a movie-show booking, and a local search engine.

7. The method of claim 2, wherein the user is connected with the vendor after the expiry of the wait time associated with the vendor.

8. The system of claim 5, wherein the processor further determines a preferred vendor from the plurality of vendors based upon the voice request message or a user profile associated with the user.

9. The system of claim 8, wherein the processor further:
   initiates the call with the preferred vendor,
   transmits the speech message to the preferred vendor,
   receives the response from the preferred vendor,
   re-establishes the call with the user after the receipt of the response from the preferred vendor, and
   communicates the response of the preferred vendor to the user over the re-established call.

\* \* \* \* \*